United States Patent [19]

Hosier et al.

[11] Patent Number: 5,451,768

[45] Date of Patent: Sep. 19, 1995

[54] ON-CHIP TEST CIRCUIT AND METHOD FOR AN IMAGE SENSOR ARRAY

[75] Inventors: Paul A. Hosier, Rochester; Scott L. Tewinkle, Ontario, both of N.Y.

[73] Assignee: Xerox Corporation, Stamford, Conn.

[21] Appl. No.: 338,299

[22] Filed: Nov. 14, 1994

[51] Int. Cl.6 ............................................. H01J 40/14
[52] U.S. Cl. .................. 250/214 R; 348/313; 250/208.1
[58] Field of Search ............ 250/208.1, 214 R, 214.1; 257/431, 461, 291, 292; 348/294, 308, 313

[56] References Cited

U.S. PATENT DOCUMENTS 4,509,077 4/1985 Therrien .
4,897,817 1/1990 Katanoska .
5,057,682 10/1991 Michon et al. .
5,081,536 1/1992 Tandon et al. .
5,285,286 2/1994 Kannegundla ..................... 348/246

Primary Examiner—Edward P. Westin
Assistant Examiner—Jacqueline M. Steady
Attorney, Agent, or Firm—R. Hutter

[57] ABSTRACT

A test system for a photosensitive array includes an on-board test circuit with a single input terminal, wherein the output of the test circuit directly affects the value of a bias charge placed on a selected photodiode. The test circuit enables a quick test for the presence of a desired bias charge when a digital-high voltage is entered on the single input terminal, and also enables a more precise test of photodiode response linearity by application of a predetermined analog voltage to the single input terminal.

6 Claims, 7 Drawing Sheets

ON-CHIP TEST CIRCUIT AND METHOD FOR AN IMAGE SENSOR ARRAY

The present application incorporates by reference U.S. application Ser. No. 5,081,536, assigned to the assignee hereof.

The invention relates to an image sensor array, and more particularly, to a system for testing sensor array uniformity by checking for the presence of a proper bias charge on each photosensor.

Image sensor arrays typically comprise a linear array of photosites which raster scan an image bearing document and convert the microscopic image areas viewed by each photosite to image signal charges. Following an integration period, the image signal charges are amplified and transferred to a common output line or bus through successively actuated multiplexing transistors.

In the scanning process, bias and reset charges are applied to each photosite cell in a predetermined time sequence during each scan cycle. Where a two stage transfer circuit is provided with each cell for transferring the image signal charges from the photosites, the bias charge has heretofore been applied to each photosite directly through a bias charge injection transistor coupled to a node between the photosite and the input to the two stage transfer circuit. However, any differences in the thresholds of the bias charge injection transistor and the first transistor of the two stage transfer circuit in one cell from the thresholds of the transistors in the other cells resulted in objectionable non-uniformities across the array.

In manufacturing a large number of sensor arrays of the type described, for example, in the patent incorporated by reference, the quality of the chips will be intimately related to the linearity of response of each photodiode and associated transfer circuit on the chip. With the "fat zero" system of the referenced patent, it has been found that a powerful technique for determining the proper linearity of response of each photodiode and transfer circuit is to determine, in a test process before the chip itself is installed in a scanning machine, whether the photodiode transfer circuit combination is operating with a proper fat zero bias. Generally, if the bias charge placed on the photodiode prefatory to exposure of the diode is proper, the photodiode - transfer circuit combination is very likely to have the desired linear response. It is common to provide as many as 128 or 256 photodiodes on each chip. If one or some predetermined number of photodiodes on a given chip do not exhibit the desired linear response, then the chip itself will be rejected.

U.S. application Ser. No. 4,509,077 discloses an electro-optical imaging system which self-diagnoses the operations of its photosensor and associated circuitry during modes of operation when no object is being imaged. The imaging sensor is tested under test light intensities to create first and second signals. A first circuit is responsive to the first and second signals and develops test signals proportional to the average values of respective portions of the first and second signals.

U.S. application Ser. No. 5,057,682 discloses a system in which the linearity and range of a photodetector system is enhanced by providing real time cancellation of condition-dependent output signals from the photosensitive devices.

According to the present invention, there is provided a photosensitive array for recording an image as electrical signals, comprising a plurality of photodiodes, an output bus, and a charge injector operable with each photodiode. A transfer circuit associated with the charge injector and with each photodiode transfers discrete output signals from the photodiode to the output bus. The charge injector injects into the transfer circuit a charge of a first amplitude to transfer an output signal from the photodiode to the output bus, and injects into the transfer circuit a charge of a second amplitude to inject a bias charge onto the photodiode. The difference between the first amplitude and the second amplitude is related to a linearity of response of the photodiode. A test circuit is operable of each transfer circuit. The test circuit has an input terminal, and an output terminal operatively connected with the transfer circuit so that a voltage on the input terminal affects the difference between the first amplitude and the second amplitude of the transfer circuit.

Figure 1:
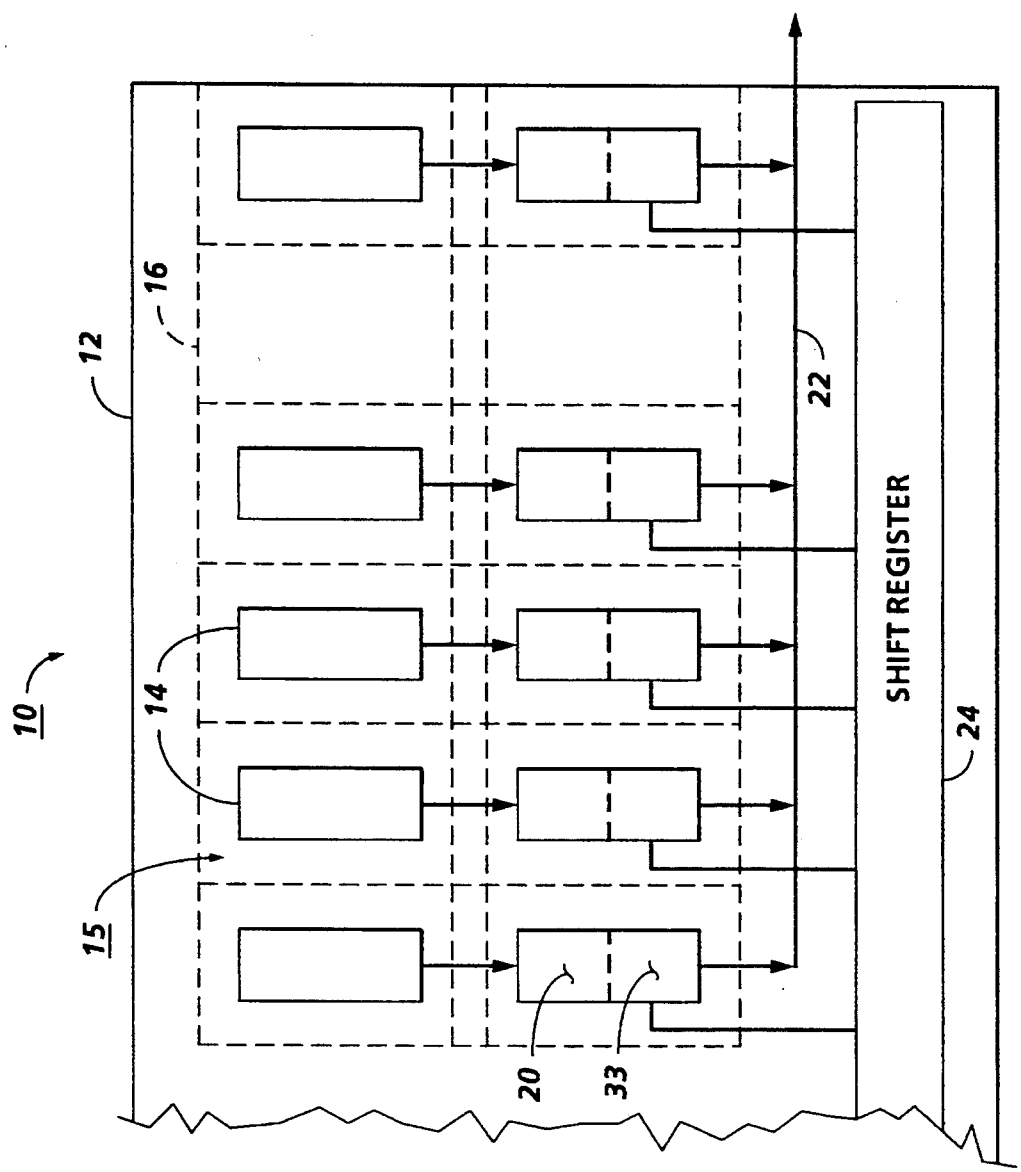
FIG. 1 is a schematic view of an image scanning array having an array of photosite cells, each cell having a photodiode with two stage transfer circuit and amplifier for transferring image signal charges from the photodiodes to a common output bus.

Referring to FIG. 1, there is shown an image sensor array with two stage transfer, designated generally by the numeral 10, of the type to which the present invention is directed. Image sensor array 10 includes a base or chip 12 of silicon with a plurality of photosites in the form of photodiodes 14 thereon. Photodiodes 14 are in closely spaced juxtaposition with one another on chip 12 in a linear array or row 16. Several smaller arrays such as array 10 can be abutted together end to end with one another to form a longer array, i.e. a full width or contact array, with spacing between the photodiodes at the butted ends the same as the spacing between the photodiodes inside the chip thereby maintaining photodiode pitch across the entire full width of the composite array.

While photodiodes 14 are shown and described herein, other photosite types such as amorphous silicon or transparent electrode MOS type photosites may be envisioned. Further, while a one dimensional sensor array having a single row 16 of photodiodes 14 is shown and described herein, a two dimensional sensor array with plural rows of photodiodes may be contemplated.

Each photodiode 14 has a two stage transfer circuit 20 associated therewith which together with the photodiode and an amplifier 33 form a photosite cell 15 at the array front end. In each cell 15, the image signal charge from the photodiode is transferred by circuit 20 to amplifier 33 where the image signal charge from photodiode 14 is amplified to bring the image signal charge to a desired potential level prior to transferring the charge to a common video output line or bus 22. Suitable shift register and logic circuitry 24 provide timing control signals $\phi_{PIXEL}$ for connecting each pixel cell 15 to bus 22 in the proper timed sequence.

Image sensor array 10 may for example be used to raster scan a document original, and in that application, the document original and the sensor array 10 are moved or stepped relative to one another in a direction (i.e., the slow scan direction) that is normally perpendicular to the linear axis of array 10. At the same time, the array scans the document original line by line in the direction (i.e., the fast scan direction) parallel to the linear axis of the array. The image line being scanned is illuminated and focused onto the photodiodes 14. During an integration period, a charge is developed on each photodiode proportional to the reflectance of the image area viewed by each photodiode. The image signal charges are thereafter transferred by two stage transfer circuits 20 via amplifier 33 to output bus 22 in a predetermined step by step timed sequence.

In the ensuing description, all transistors shown are N-channel type. However, P-channel transistors may instead be used with appropriate voltage level changes as will be understood.

Figure 2:
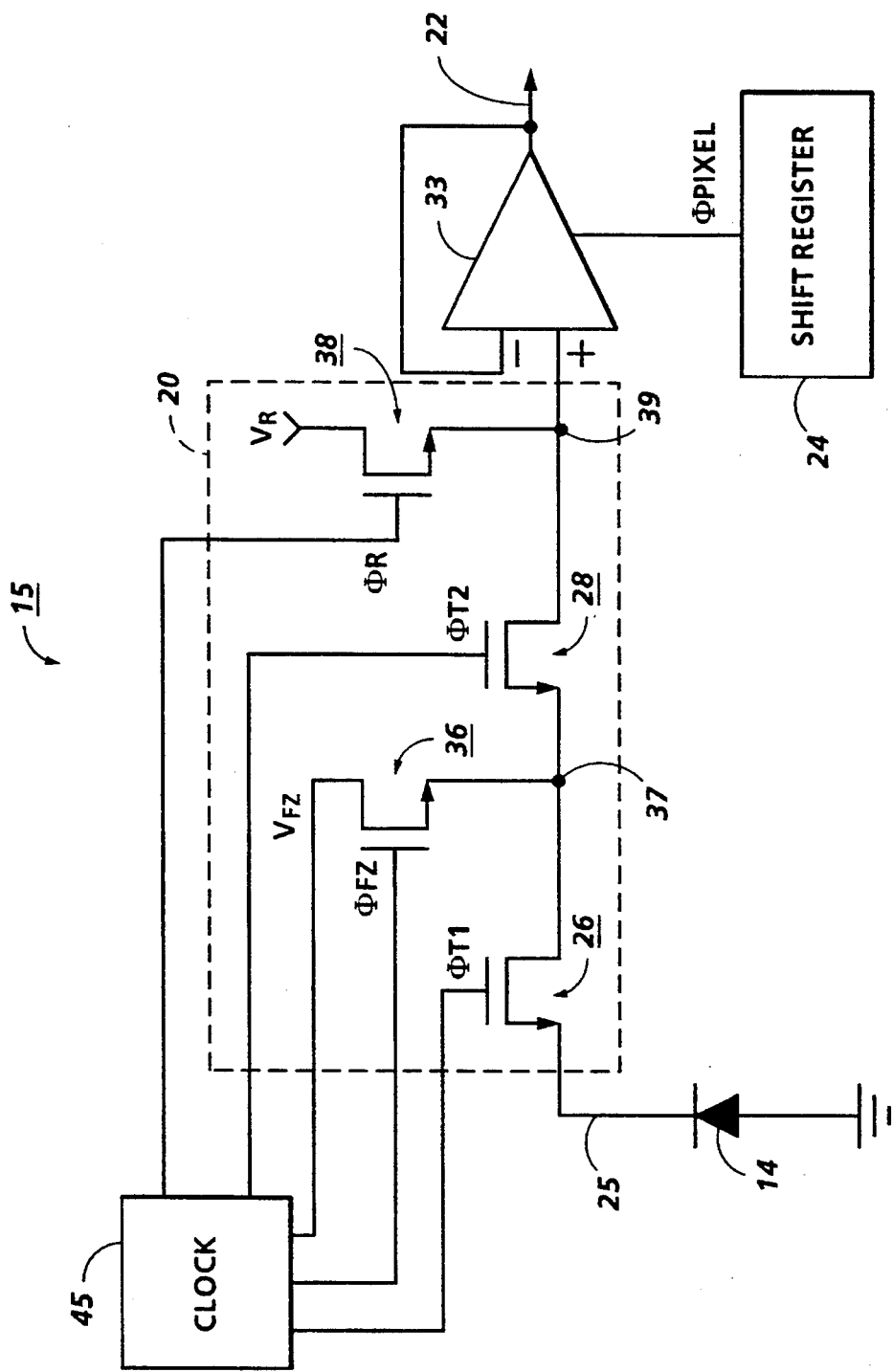
FIG. 2 is a circuit schematic showing a photosite cell and the amplifier with a transfer circuit, for testing by the present invention.
Figure 3:
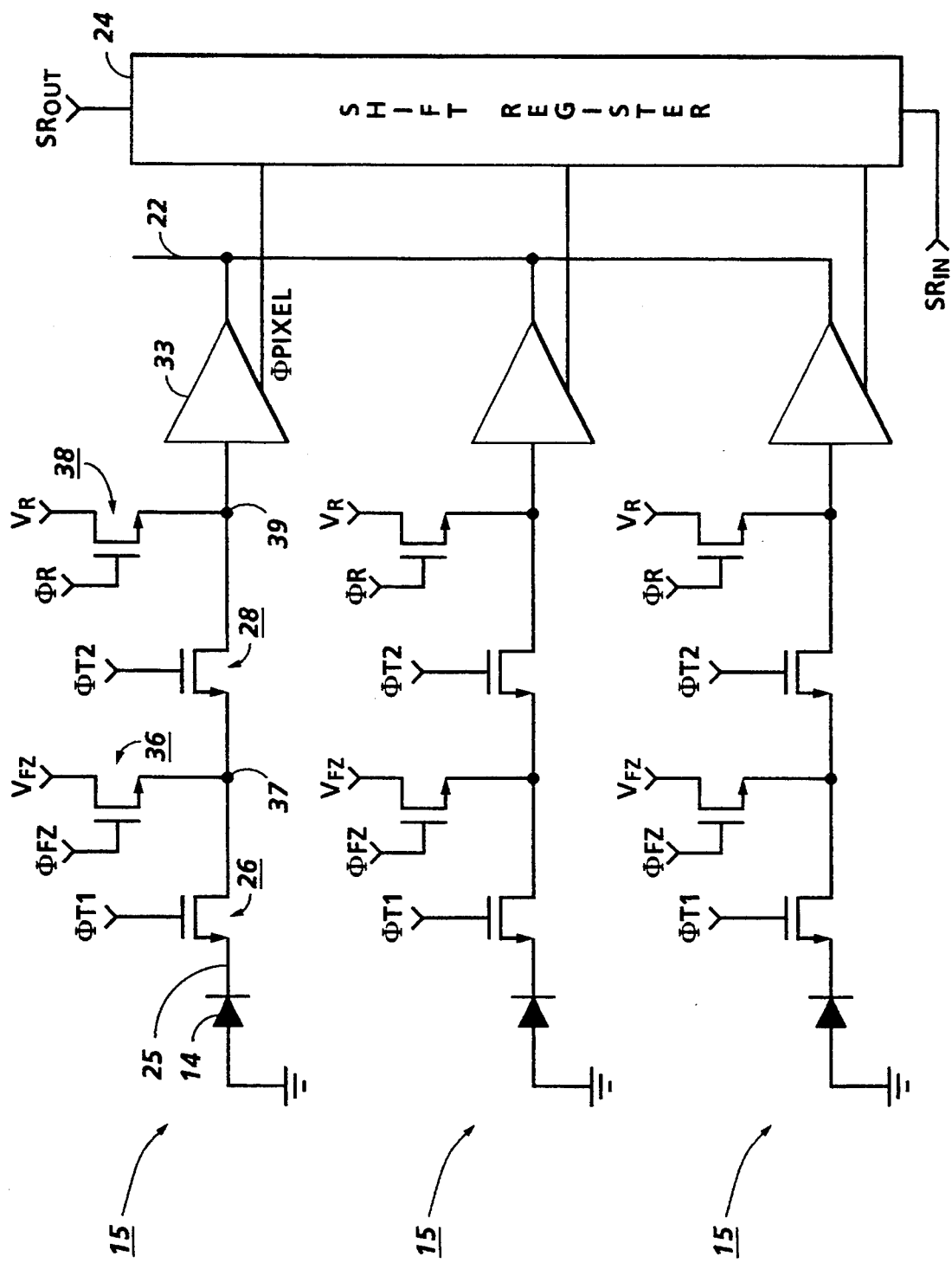
FIG. 3 is a schematic view depicting an array of photosite cells which may be tested with the present invention.
Figure 4:
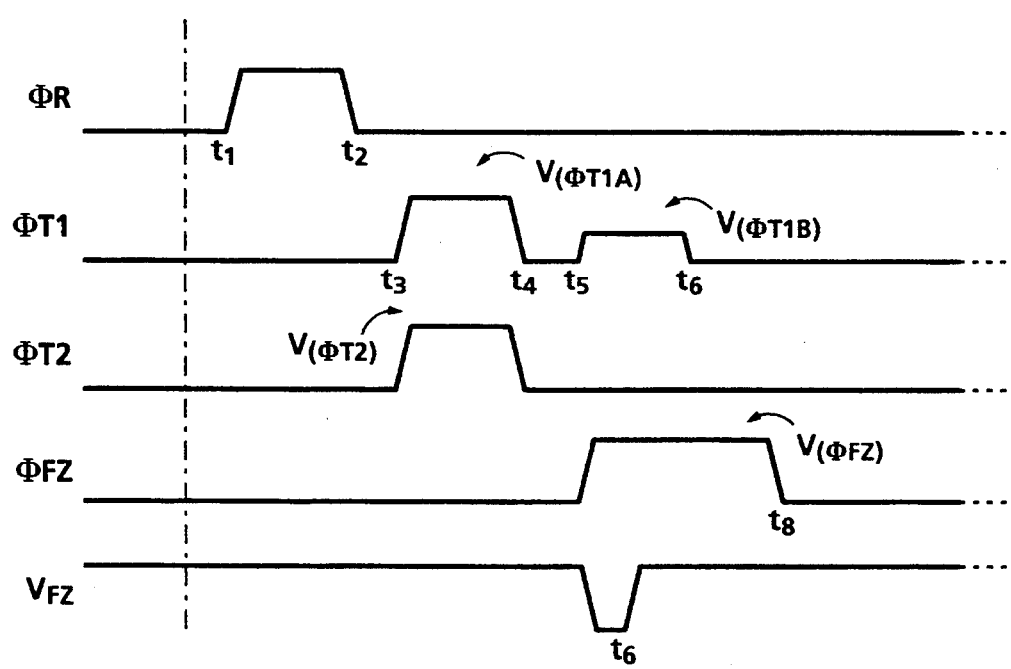
FIG. 4 is a timing diagram showing various voltage pulse waveforms for the transfer circuit shown in FIGS. 2 and 3.

Referring particularly to FIGS. 2-4, the two stage transfer circuit 20 associated with each cell 15 has first and second stage transfer transistors 26, 28 for transferring the image signal charge from the photodiode 14 to amplifier 33. Transistors 26, 28 are in series with line 25 connecting one electrode of photodiode 14 with the input gate of amplifier 33. The other electrode of photodiode 14 is grounded.

A bias charge injection transistor 36 is provided to inject a bias charge, for example, an electrical fat zero $V_{FZ}$, to line 25 at middle node 37. Positioning transistor 36 between transistors 26, 28 and selecting the proper clock voltage levels allows transistor 26 to determine the surface potential during both the bias charge injection and charge transfer phases. As a result, the amount of bias charge injected is not dependent on the thresholds of transistors 36 and 26. This eliminates non-uniformities caused by transistor threshold variations from cell to cell while maintaining the high transfer efficiency provided by two stage transfer. A reset transistor 38 controls the reset voltage VR at the node 39 between transistor 28 and amplifier 33.

A suitable clock source 45 provides pulses $\phi_R$, $\phi_{t1}$, $\phi_{t2}$, $\phi_{FZ}$, and $V_{FZ}$. Pulses $\phi_{t1}$, $\phi_{FZ}$, and $V_{FZ}$ provide for injection of the bias c line 25, and pulses $\phi_{t2}$ and $\phi_R$, for injection of the reset voltage $V_R$ to line 25 at node 39. As will appear, pulses $\phi_{t1}$ and $\phi_{t2}$ of different amplitude are provided for transferring the image signal charges from photodiodes 14 to amplifiers 33. The $\phi_{PIXEL}$ signals for multiplexing the amplified charge output by amplifier 33 onto the common video output bus 22 are provided by shift register and logic circuitry 24.

In operation and referring particularly to FIGS. 2-4, during time interval $t_1$-$t_2$, pulse $\phi_R$ actuates reset transistor 38 to apply reset voltage $V_R$ to node 39 to reset the input to amplifier 33. Subsequently, at time interval $t_3$-$t_4$, pulses $\phi_{t1}$ and $\phi_{t2}$ actuate transistors 26 and 28 respectively of two stage transfer circuit 20 to transfer the image signal charge accumulated on the photodiodes 14 of each cell 15 to amplifiers 33. To facilitate transfer of the image signal charges, the amplitude $V(\phi_{t1A})$ of pulse $\phi_{t1}$ is smaller than the amplitude $V(\phi_{t2})$ of pulse $\phi_{t2}$.

For injection of the bias charge, at time $t_5$, the $\phi_{t1}$ and $\phi_{FZ}$ pulses go high while pulse $V_{FZ}$ goes low during "fill," then high again during the "spill" portion of fat-zero bias injection, as described for example in the patent incorporated by reference. Following preset intervals at times $t_6$, $t_7$, and $t_8$, the pulses $V_{FZ}$, $\phi_{t1}$, and $\phi_{FZ}$ return to their nominal level.

During bias charge injection, transistor 26 of two stage transfer circuit 20 serves as a metering gate with the amplitude $V(\phi_{t1B})$ of the pulse $\phi_{t1}$ applied to transistor 26 being less than the amplitude $V(\phi_{t1A})$ of the pulse $\phi_{t1}$ applied during the image signal charge transfer cycle. Since the amount of bias charge injected is proportional to the difference between amplitudes $V(\phi_{t1A})$-$V(\phi_{t1B})$, the amount of charge transferred is controlled by and is independent of the threshold voltage of the transistors.

In order for a practical system such as here described to work effectively, it is crucial that the difference between amplitudes $V(\phi_{t1A})$-$V(\phi_{t1B})$ which is directly proportional to the amount of bias charge injected onto photodiode 14, is at a predetermined desirable level. This difference may serve as a key test parameter when the cell 15 is in a test mode. Such a test mode may occur, for example, right after the chip has been manufactured, and before it is installed in a machine such as a scanner, copier, or facsimile. It is the function of the on-chip circuit and method of the present invention to facilitate testing of individual cells 15 on a chip for the desired linearity of response, by testing for the proper bias injection on individual selected cells.

Figure 5:
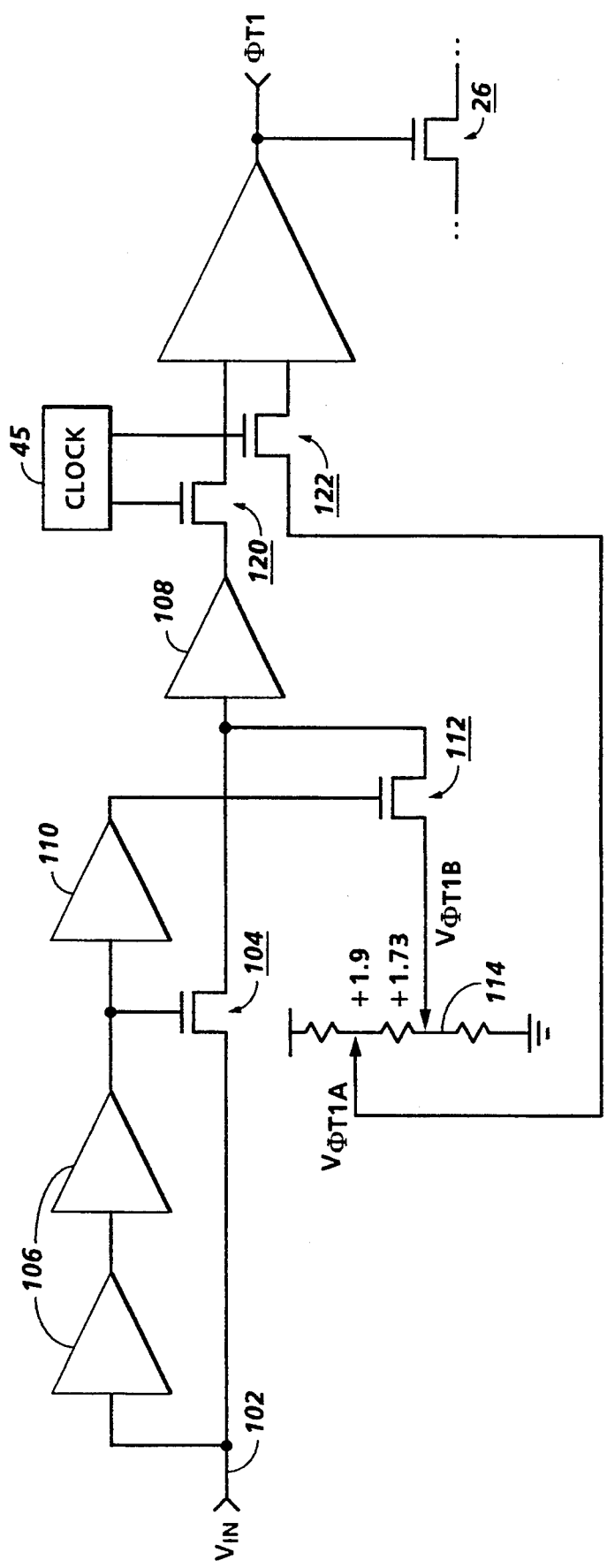
FIG. 5 is a schematic diagram of a test circuit according to the present invention.

FIG. 5 is a circuit diagram showing the circuitry associated with the system and method of the present invention. A test circuit 100 is intended to be located right on the chip 10. Test circuit 100 is operatively connected, by means not shown, to the cells 15 on the chip 10 in such a way that all cells 15 receive the output of test circuit 100 at the same time. Generally, only one test circuit 100 is required on a chip, and can be used to test any selected cell 15 on the chip.

The input to test circuit 100, shown as $V_{IN}$, is typically a fixed voltage of known magnitude, and may be derived from a voltage source internal or external to the chip. What is important is that the input to test circuit 100 be known and controllable. The output of test circuit 100 is the value of $\phi_{t1}$, which is directed to the transistors 26 on all of the cells 15 on the chip. When this known predetermined voltage level is placed on the transistor 26, the output of the cell 15, such as at 22 in FIG. 2 above, can then be tested.

Test circuit 100 includes a through-line 102 which includes thereon a transistor 104 which is activated by a set of mutual inverters 106 in parallel therewith. In this way, when a sufficiently high voltage is placed on $V_{IN}$ to activate the inverters 106, transistor 104 will be activated so that the $V_{IN}$, whatever its actual value above the threshold, will be fed right through an inverter 108 and ultimately directly onto the $\phi_{t1}$ on a transistor 26 in a selected cell 15 being tested. However, if the magnitude of $V_{IN}$ is less than a threshold value to activate transistor 104, the insufficient voltage through mutual inverters 106 will again be inverted through inverter 110 and used to activate a default transistor 112. When default transistor 112 is activated, as shown, a reference voltage from a fixed source 114 will be sent through the default transistor 112 and ultimately onto a transistor 26 as voltage $\phi_{t1}$.

Also shown as part of test circuit 100 is a set of alternating transistors indicated as 120 and 122, responsive to an input, for example, from clock 45 or some other structure within the chip. The function of these two alternating transistors, returning to FIG. 4, is to select a value of $\phi_{t1}$ depending on whether the relatively high voltage $\phi_{t1A}$ or $\phi_{t1B}$ is required when the particular cell 15 is in use. As noted above, it is this difference in amplitude among the two signals $\phi_{t1A}$ and $\phi_{t1B}$ in FIG. 4 which determines the amount of bias charge that will be placed on the associated photodiode 14. As can be seen in FIG. 5, if transistor 120 is activated by clock 45, the value of $\phi_{t1}$ will be either $V_{IN}$ (in the test mode) or a direct +1.73 volts from voltage source 114. If, instead, transistor 122 is activated, the input of will be +1.9 volts from voltage source 114. In the illustrated embodiment, this lower voltage, $\phi_{t1B}$, may be substituted with a predetermined known input voltage $V_{IN}$. These two possible voltage levels represent the levels of $\phi_{t1A}$ and $\phi_{t1B}$ shown in FIG. 4, respectively. As mentioned above, the difference between amplitudes $V(\phi_{t1A})-V(\phi_{t1B})$ is directly proportional to the amount of bias charge injected onto photodiode 14, and is therefore a key "tell-tale" as to whether a particular cell 15 has a desirable linear response.

Figure 6:
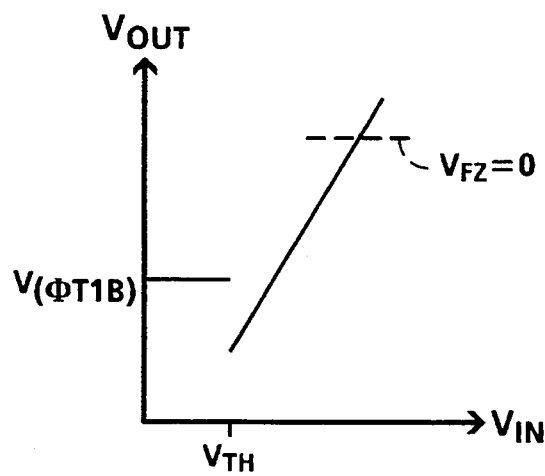
FIG. 6 is a graph showing the voltage response of the circuit of FIG. 5.

FIG. 6 is a graph of the $V_{IN}-V_{OUT}$ response of test circuit 100, showing the output $V_{OUT}$, which is applied to the cell 15 as $\phi_{t1}$, as $V_{IN}$ increases. In this way, the difference between amplitudes $V(\phi_{t1A})-V(\phi_{t1B})$, which affects the linearity of the cell, can be tested. At very low levels of $V_{IN}$, insufficient to activate transistor 104, transistor 112 will be activated to output the fixed voltage from voltage source 114 as the value of $\phi_{t1}$. However, as shown in FIG. 6, once $V_{IN}$ reaches a threshold level $V_{TH}$, the increased voltage will cause an activation of transistor 104, thereby creating a direct connection on through-line 102 directly between $V_{IN}$ and the output of $\phi_{t1}$. As shown in FIG. 6, once the connection is made, the relationship between $V_{IN}$ and $\phi_{t1}$ becomes identical. If the input of $V_{IN}$ is sufficiently high when the voltage of $\phi_{t1B}$ is placed on transistor 26, in effect no bias charge will be placed on photodiode 14.

In the test process, a $V_{IN}$ of a certain predetermined level is entered into test circuit 100, and, according to the function shown in FIG. 6, a particular voltage of $\phi_{t1}$ will be placed on the transistor 26 of the cell 15. Once this known bias is placed on photodiode 14 as a result of the magnitude of $V_{IN}$, the entire cell 15 is run through the two-step transfer process described above, in particular going through the stages in the timing diagram of FIG. 4. Generally, for this test run no external light is emitted onto photodiode 14, so that only the controlled voltage from test circuit 100 is effecting the photodiode 14. Different values of $V_{IN}$, creating different output values of $\phi_{t1}$, will in effect enable experimentation with the relative amplitudes of $V(\phi_{t1A})$ and $V(\phi_{t1B})$ as shown in FIG. 4. If, for example, $\phi_{t1B}$ is equal to or greater than $\phi_{t1A}$, there will be no bias charge injected on photodiode 14; once again, the initial bias charge on photodiode 14 is directly related to the difference between these voltage amplitudes.

To illustrate a testing method with the circuit 100 of the present invention, and assuming the values of +1.9 volts for $V(\phi_{t1A})$ and +1.73 volts for $V(\phi_{t1B})$, the initial test voltage on $V_{IN}$ is a TTL (i.e., digital) up level of approximately +4 volts. The test voltage applied on $V_{IN}$ can be sourced from the chip itself or from an external circuit used in the testing process. A $V_{IN}$ of +4 volts will be sufficient to close transistor 104 and cause the direct +4 volts input to go along through-line 102 through inverter 108 and ultimately be applied to the transistor 26 as the voltage $\phi_{t1}$. Turning to FIG. 6, this input of +4 volts is so much higher than the +1.9 volts that a negative fat zero injection will be placed on the photodiode 14. Because of the specific nature of the cell design in FIG. 2, a negative bias injection on photodiode 14 will result in no charge injection on the photodiode. Because there is no fat-zero bias charge on the photodiode 14, no bias charge will be transferred to reset node 39 when the two-step transfer circuit 20 goes through its standard transfer process. If the actual voltage ending up on reset node 39 is different from that predicted in view of the known voltage placed on transistor 26, then the tester will have a strong indication that the cell 15 (either the photodiode 14, the transfer circuit 20, or both) is defective.

If the linear portion of the function shown in FIG. 6, wherein $V_{IN}$ is greater than $V_{TH}$, is used, the actual success of placing a specific bias charge on photodiode 14 can be tested directly, by comparing the value of a known $V_{IN}$ with the charge that ultimately appears on reset node 39.

The particular design advantage of the circuit of FIG. 5, having the response shown in FIG. 6, is that a single input port for $V_{IN}$ can accept either a digital or an analog signal. For a quick test of a particular cell 15, simply to test whether the intended bias charge is properly placed on the photodiode 14, a simple two-part test with digital signals can be carried out. First, a simple TTL high, or digital 1, value of approximately +4 volts, which can be easily output by any microprocessor, is placed on $V_{IN}$. Because of the particular structure of the circuit shown in FIG. 2, such a TTL value would be so high as to cause no bias charge to be injected onto photodiode 14, and therefore would create no bias charge to be transferred to reset node 39 when the transfer steps are carried out. Second, the input $V_{IN}$ is then put to a digital 0; since this is below $V_{TH}$ the default $\phi_{t1B}$ level will be sent out during the fat zero injection portion of the cycle. This will cause a default bias charge to be created on photodiode 14, which will then be transferred to node 39 and read out. The difference in levels on node 39 between the $V_{IN}=1$ and $V_{IN}=0$ states is the amount of bias charge being injected in normal operation of the transfer circuit of cell 15. This amount of bias charge is directly relevant to the linearity of response of the individual cell.

In a practical application, this quick test for the mere presence of a bias charge injection will be sufficient when testing all of the photodiodes in an array chip. If, however, a more detailed test is required for a particular cell, then more precise $V_{IN}$ values of greater than $V_{TH}$ but less than a value in which the bias charge placed on 14 would be zero can be used, and a comparison between the intended bias charge placed on photodiode 14 and the voltage which ends up on reset node 39 can be tested against predicted levels.

Figure 8:
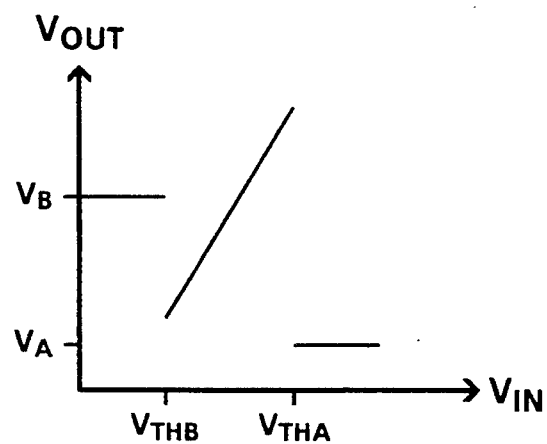
FIG. 8 is a graph showing the voltage response of the circuit of FIG. 7.
Figure 7:
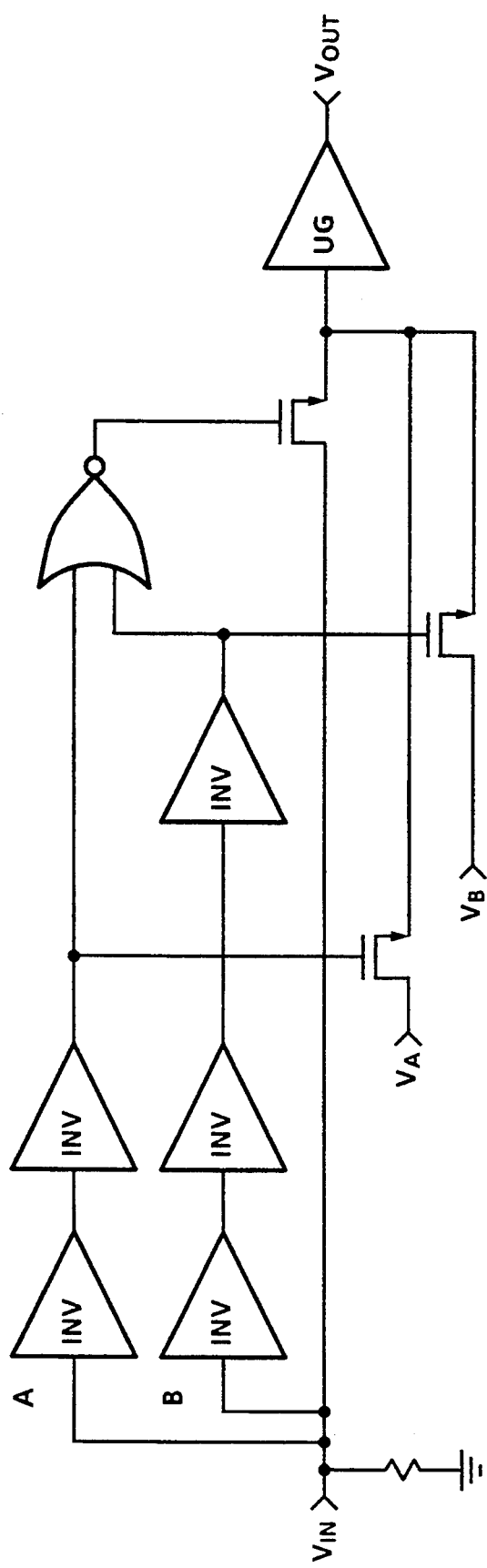
FIG. 7 is a schematic diagram of another embodiment of a test circuit according to the present invention.

FIG. 7 shows a more general case of a test circuit 200, wherein the response, shown in FIG. 8, includes a first constant value should the input be less than a first threshold, followed by a linear portion shown as the central portion of the graph, and finally, a predetermined second constant value should the $V_{IN}$ be greater than a second threshold. Conceivably, the first constant value could be greater or less than the second constant value, depending on the specific design tests desired for the system. The operation of the circuit in FIG. 7 will be apparent from the diagram. Such a circuit could be used, for example, to manipulate both values $\phi_{t1A}$ and $\phi_{t1B}$ as shown in the timing diagrams of FIG. 4.

One practical value of the circuit of the present invention is that it serves as a dual function input. The circuit of the invention allows one analog input to simultaneously put the chip in test mode (acting as a digital input, when above the threshold of the digital inverter) and also supply the analog test signal through the same $V_{IN}$ terminal. In heretofore known on-board test circuit designs, there is often a separate digital control input terminal for putting the chip in normal mode or a separate test mode, with an externally supplied analog signal supplied through another dedicated analog input terminal. Such an arrangement results in an overhead of wasted die area for the relatively large pads and electrostatic discharge protection for the extra terminal.

The present invention allows the simple verification (by toggling the input $V_{IN}$ between digital 0 and 1) of the functionality of fat zero injection circuits, which is an indirect verification that none of the pixels will have non-linear behavior due to the absence of proper fat zero injection. In addition, more detailed characterization of normal or abnormal behavior of the circuit can be done by using an analog input $V_{IN}$ in the linear-response range just above $V_{TH}$. This analog signal can also be used to directly test the linearity of the analog circuit portion of each cell, other than the photodiode itself. With the present invention, a single signal input can be used to test the linearity of a photosensor or its analog video path. This purely electrical method of checking linearity of a cell is much simpler and less time-consuming than an optical-based method.

While the invention has been described with reference to the structure disclosed, it is not confined to the details set forth, but is intended to cover such modifications or changes as may come within the scope of the following claims.

We claim:

1. A photosensitive array for recording an image as electrical signals, comprising:
   a plurality of photodiodes;
   an output bus;
   a charge injector operable with each photodiode;
   a transfer circuit associated with the charge injector and with each photodiode, for transferring discrete output signals from the photodiode to the output bus, the charge injector injecting into the transfer circuit a charge of a first amplitude to transfer an output signal from the photodiode to the output bus, and injecting into the transfer circuit a charge of a second amplitude to inject a bias charge onto the photodiode, the difference between the first amplitude and the second amplitude being related to a linearity of response of the photodiode; and
   a test circuit selectably operable of each transfer circuit when the photosensitive array is in a test mode, the test circuit having an input terminal and an output terminal operatively connected with the transfer circuit of a selected photodiode being tested so that a voltage on the input terminal affects the difference between the first amplitude and the second amplitude of the transfer circuit, the output of the test circuit being of a voltage wherein no bias injection is caused to be injected onto the photodiode when a predetermined test voltage is entered on the input terminal.

2. The array of claim 1, wherein the output of the test circuit is of a voltage wherein no bias injection is caused to be injected onto the photodiode when a voltage consistent with a digital 1 value is entered on the input terminal.

3. A photosensitive array for recording an image as electrical signals, comprising:
   a plurality of photodiodes;
   an output bus;
   a charge injector operable with each photodiode;
   a transfer circuit associated with the charge injector and with each photodiode, for transferring discrete output signals from the photodiode to the output bus, the charge injector injecting into the transfer circuit a charge of a first amplitude to transfer an output signal from the photodiode to the output bus, and infecting into the transfer circuit a charge of a second amplitude to inject a bias charge onto the photodiode, the difference between the first amplitude and the second amplitude being related to a linearity of response of the photodiode; and
   a test circuit operable of each transfer circuit, the test circuit having an input terminal and an output terminal operatively connected with the transfer circuit so that a voltage on the input terminal affects the difference between the first amplitude and the second amplitude of the transfer circuit, the output of the test circuit being of a voltage wherein no bias injection is caused to be injected onto the photodiode when a voltage consistent with a digital 1 value is entered on the input terminal;
   the test circuit having a response wherein the output of the test circuit is a constant value when the voltage on the input terminal is below a predetermined threshold and linearly related to the voltage on the input terminal when the voltage on the input terminal is above the threshold.

4. The array of claim 3, wherein the constant value is of a voltage wherein a bias injection is caused to be injected onto the photodiode when the voltage at the constant value is injected into the transfer circuit.

5. The array of claim 3, the test circuit having a response between the input terminal and an output terminal so that the output of the test circuit is a second constant value when the voltage on the input terminal is above a second predetermined threshold, the second threshold being higher than the first-mentioned threshold.

6. The array of claim 5, the second constant value being lower than the first-mentioned constant value.

* * * * *